United States Patent [19]
Fujioka et al.

[11] Patent Number: 5,150,298
[45] Date of Patent: Sep. 22, 1992

[54] BRAKE CONTROL DEVICE IN AN ANTILOCK BRAKE SYSTEM

[75] Inventors: Hideaki Fujioka; Yoshio Katayama, both of Itami, Japan

[73] Assignee: Sumitomo Electric Industries, Ltd., Osaka, Japan

[21] Appl. No.: 700,885

[22] Filed: May 10, 1991

Related U.S. Application Data

[63] Continuation of Ser. No. 492,103, Mar. 12, 1990, abandoned.

[30] Foreign Application Priority Data

Mar. 13, 1989 [JP] Japan .................................. 1-60326
Mar. 15, 1989 [JP] Japan .................................. 1-63295
Apr. 28, 1989 [JP] Japan .................................. 1-109940

[51] Int. Cl.$^5$ .............................................. B60T 8/32
[52] U.S. Cl. .................................. 364/426.02; 303/95; 303/100; 303/103
[58] Field of Search ............... 364/426.02; 180/197; 303/95, 97, 100, 103, 105, 106

[56] References Cited

U.S. PATENT DOCUMENTS

| | | | |
|---|---|---|---|
| 4,489,382 | 12/1984 | Jonner et al. | 364/426.02 |
| 4,673,226 | 6/1987 | Every et al. | 364/426.02 |
| 4,685,746 | 8/1987 | Matsuda | 303/97 |
| 4,755,945 | 7/1988 | Kade et al. | 303/100 |
| 4,783,126 | 11/1988 | Arikawa | 303/97 |
| 4,794,538 | 12/1988 | Cao et al. | 303/95 |
| 4,855,917 | 8/1989 | Sawano et al. | 303/95 |
| 4,881,784 | 11/1989 | Leppek | 303/105 |

Primary Examiner—Gary Chin
Attorney, Agent, or Firm—Cushman, Darby & Cushman

[57] ABSTRACT

A brake control device in an antilock brake system is disclosed for automatically adjusting a valve according to a wheel brake locking symptom to reduce a fluid pressure in a brake cylinder and eliminating symptom of brake locking. The brake control device includes a microcomputer which has a step for outputting a pressure reduction signal K required to eliminate a locking symptom, and a detector for detecting a current brake cylinder pressure. The microcomputer further has a step for correcting the pressure reduction signal K based on the current brake cylinder pressure. Thus, a corrected pressure reduction signal K is used for reducing the brake cylinder pressure.

15 Claims, 10 Drawing Sheets

Fig. 7a WHEEL SPEED (ASPHALT ROAD)   (SNOW-COVERED ROAD)

Fig. 7b WHEEL DECEL

Fig. 7c FLAG

Fig. 7d K

Fig. 7e VEHICLE DECEL

Fig. 7f α

Fig. 7g EXH-SOL

Fig. 7h INT-SOL

Fig. 7i BRAKE FLUID PRESSURE

BRAKE CONTROL DEVICE IN AN ANTILOCK BRAKE SYSTEM

This is a continuation of application Ser. No. 492,103, filed on Mar. 12, 1990, which was abandoned.

BACKGROUND OF THE INVENTION

1. Field of the Invention

The present invention relates to a brake control device in an antilock brake system.

2. Description of the Prior Art

The present invention is related to an antilock brake system, and particularly to a brake control device in an antilock brake system.

Prior Art:

An antilock brake system is a brake control system which automatically reduces the brake cylinder fluid pressure (hereinafter "brake fluid pressure") to lower the brake pressure and cancel wheel locking when the brakes are applied and the wheels lock and begin to slip on the road surface; when this antilock control is applied it overrides the operation of the brakes by the driver.

Figure 1:
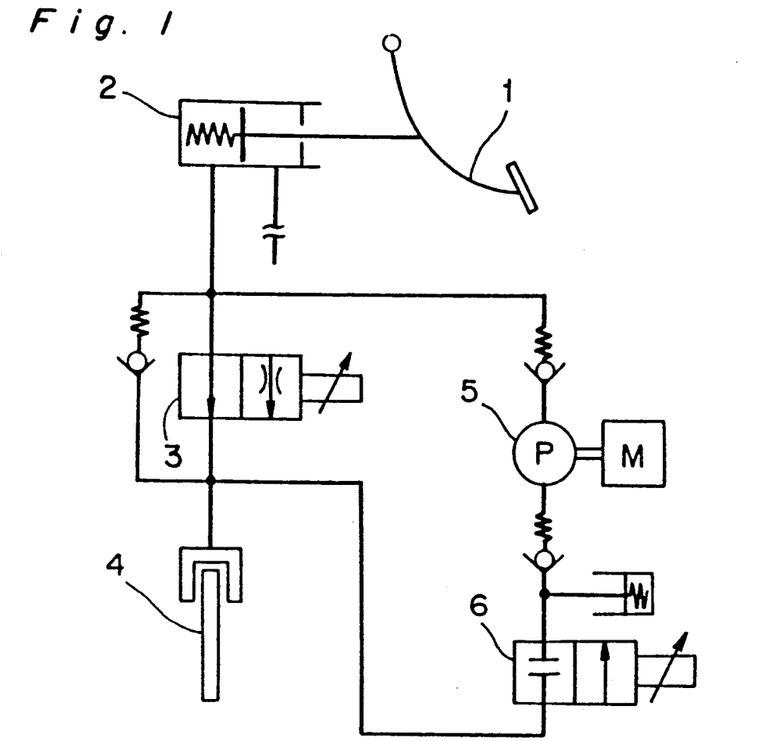
FIG. 1 is a block diagram of the brake fluid pressure system.

In FIG. 1 is shown a conventional brake pressure control system. When the brake pedal is pressed, the fluid pressure inside the brake cylinder 2 rises, and the brakes 4 are applied by means of the intake solenoid valve 3. If the wheels lock because the brakes are excessively applied, the antilock control system functions: the intake solenoid valve 3 is displaced to the pressure rise buffer position and the exhaust solenoid valve 6 is displaced to the conductivity position for the calculated time period $\Delta T$. The fluid pressure applied to the brakes 4 is thus lowered, the brake 4 pressure decreases, and the wheels can be released from the locked state.

Figure 2A:
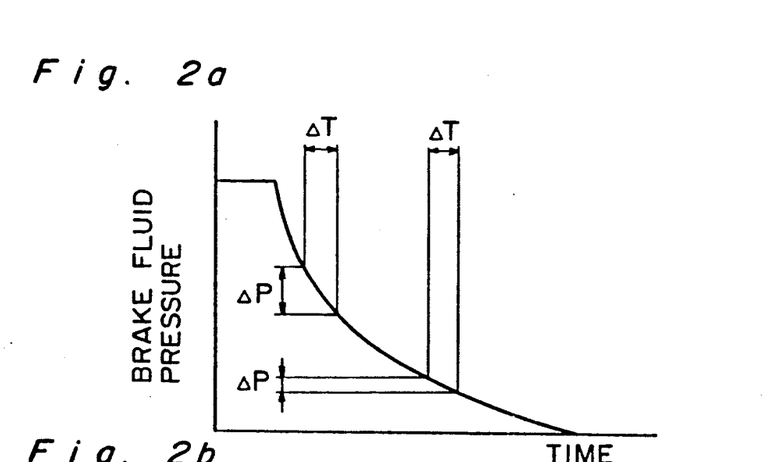
FIG. 2(a) is a graph showing the change in brake fluid pressure.

Problem to be Solved by the Invention:

In general, brake fluid pressure characteristics vary non-linearly as shown in FIG. 2(a). As a result, the higher the brake fluid pressure is when pressure reduction is first applied, the wider pressure reduction band $\Delta P$ becomes for the same time period $\Delta T$. Thus, in order to obtain a given pressure reduction band, the time period $\Delta T$ must vary according to the brake fluid pressure.

However, since conventional devices do not compensate the pressure reduction time according to the actual or estimated brake fluid pressure, antilock control begins at a low brake fluid pressure on frozen roads, snow-covered roads, and other road surfaces with a low coefficient of friction $\mu$ ("low $\mu$ surfaces"); this results in excessive tire slipping, as well as reduced steering control on front wheel drive vehicles, and reduced vehicle stability on rear wheel drive vehicles due to insufficient reduction of the brake fluid pressure. Furthermore, on asphalt and other road surfaces with a high coefficient of friction $\mu$ ("high $\mu$ surfaces"), antilock control begins at a high brake fluid pressure, resulting in excessive brake fluid pressure reduction which may cause vehicle deceleration to fluctuate and the required braking distance to increase.

SUMMARY OF THE INVENTION

The present invention has been developed with a view to substantially solving the above described disadvantages and has for its essential objective to provide an improved brake control device in an antilock brake system.

The objective of the present invention is thus to provide, in an antilock brake control system which automatically adjusts a valve according to the wheel locking symptoms to reduce the brake cylinder pressure and alleviate the locking symptoms, a brake control device with which a desirable pressure reduction rate can normally be obtained whether the brake pressure is low or the brake pressure is high.

In accomplishing these and other objectives, a brake control device in an antilock brake system, according to the present invention is used for automatically adjusting a valve according to a wheel brake locking symptom to reduce a fluid pressure in a brake cylinder and for eliminating symptom of brake locking. The brake control device according to the present invention comprises means for outputting a pressure reduction signal K required to eliminate a locking symptom, means of detecting a current brake cylinder pressure; and means for correcting said pressure reduction signal K based on the current brake cylinder pressure, whereby a corrected pressure reduction signal K is used for reducing the brake cylinder pressure.

In addition, in the present invention adjustment of the valve is accomplished by controlling the on and off states of the solenoid which is provided to work in association with the valve.

Furthermore, the pressure reduction means is comprised of a means which outputs the compensation value $\alpha$ according to the brake cylinder pressure, a means which uses the compensation value to correct the pressure reduction signal K and outputs the solenoid opening coefficient J, and a drive means which drives the solenoid on and off at the duty ratio obtained from the solenoid opening coefficient J.

The compensation value $\alpha$ takes a high value when the brake cylinder pressure is low, i.e., when the vehicle deceleration is slow, and takes a low value when the brake cylinder pressure is high, i.e., when the vehicle deceleration is fast. Therefore, because the compensation value $\alpha$ is low on an asphalt or other high $\mu$ road surface for a given level of pressure reduction, the compensation amount is small, and the solenoid opening coefficient J takes a value roughly equivalent to the initially set pressure reduction signal K. On the other hand, because the compensation value $\alpha$ is high on snow-covered roads or other low $\mu$ road surfaces, the solenoid opening coefficient J takes a value greater than pressure reduction signal K. Thus, the brake control device operates such that the open time of the valve is longer and the desired degree of pressure reduction can be obtained even when the brake cylinder pressure is low.

BRIEF DESCRIPTION OF THE DRAWINGS

These and other objectives and features of the present invention will become apparent from the following description taken in conjunction with preferred embodiments thereof with reference to the accompanying drawings, throughout which like parts are designated by like reference numerals and in which.

DETAILED DESCRIPTION OF THE PREFERRED EMBODIMENTS

First Embodiment

Figure 3:
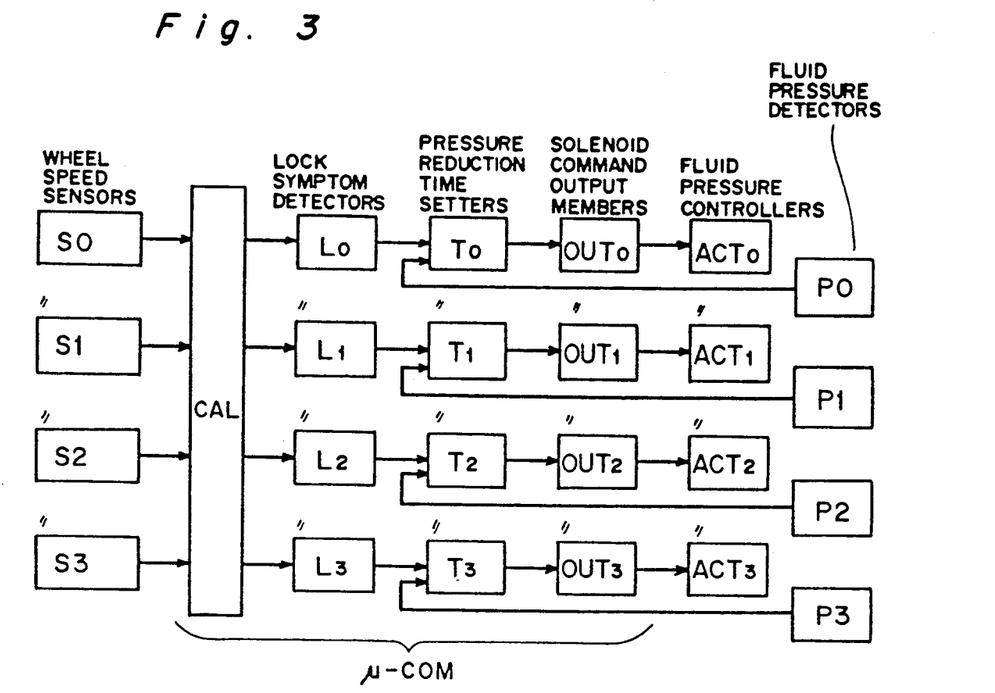
FIG. 3 is a block diagram showing the brake control device in an antilock brake control system according to a first embodiment of the present invention.

Referring to FIG. 3, a block diagram of the brake control device in an antilock brake control system according to the present invention is shown. In this figure, S0, S1, S2 and S3 are the wheel speed sensors which detect the speed of each wheel; CAL is the calculator which computes the wheel deceleration and estimated vehicle deceleration from the wheel speed; L0, L1, L2 and L3 are the lock symptom detectors which detect the locking symptoms for each wheel; T0, T1, T2 and T3 are pressure reduction time setters to which are input the brake pressure for each wheel from the fluid pressure detectors P0, P1, P2, and P3, and which set the pressure reduction. time required to apply antilock brake control to each wheel. OUT0, OUT1, OUT2 and OUT3 are solenoid command output devices which output a drive command to the solenoid of the solenoid valve according to the pressure reduction time; and ACT0, ACT1, ACT2 and ACT3 are pressure reduction controllers which include an intake solenoid valve and exhaust solenoid valve. In the above construction, it is preferable that the calculator, lock symptom detector, pressure reduction time setter, and solenoid command output device be comprised of a microcomputer for processing.

It is to be noted that the fluid pressure. detectors need not necessarily be provided a all four wheels, and it is sufficient to provide one on only one of the right wheels and one on only one of the left wheels.

In addition, the fluid pressure detectors may be hydraulic pickups which directly detect the brake fluid pressure, but vehicle deceleration sensors may also be used because the brake fluid pressure and the vehicle deceleration have a proportional relationship. In this case, a pressure signal may be sent from one of the vehicle deceleration sensors to the pressure reduction time setters T0, T1, T2, T3.

Figure 4:
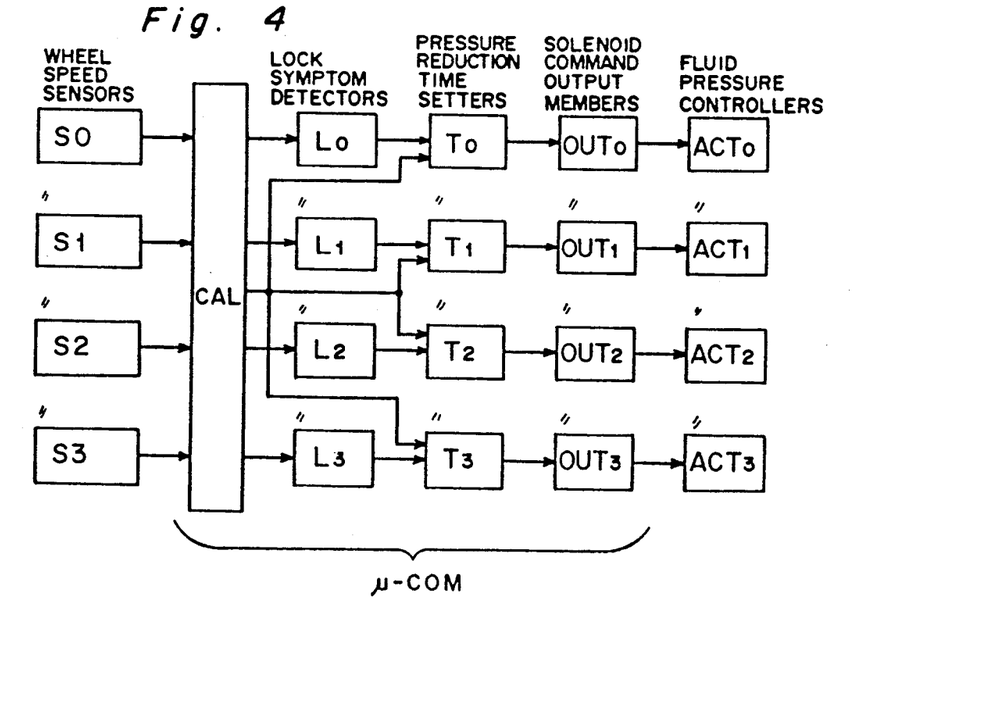
FIG. 4 is a block diagram showing a modification of the device shown in FIG. 3.

Also, as shown in FIG. 4, instead of providing an independent fluid pressure detector, the estimated vehicle deceleration may also be computed from the wheel speed by the calculator CAL and the fluid pressure signal output based on this result.

The operation of the brake control device in this antilock brake control is described herein below with reference to the flow chart in FIG. 5. It is to be noted this flow chart describes the process for only one wheel, but the same control operation is also executed for the other wheels.

At step #1, the wheel speed, wheel deceleration, estimated vehicle deceleration and compensation value α are calculated. Note that the method of calculating the estimated vehicle deceleration may be that described, for example, in U.S. patent application Ser. No. 07/291650, now U.S. Pat. No. 4,969,100 or any other known method. The value obtained from the graph shown in FIG. 6 according to the estimated vehicle deceleration is output as compensation value α.

At step #2, it is determined whether there are any symptoms of brake locking. Brake locking may be detected by determining that the wheel deceleration is below a predefined wheel deceleration threshold Dt when the wheel speed is also below a predefined wheel speed threshold St, or by another method of common knowledge. When brake locking symptoms are detected, a flag is set at step #3 and the antilock timer is cleared; when locking symptoms are not detected, a flag is reset at step #4, and the antilock timer is incremented.

At step #5, it is determined whether the flag is set or not; if it is not, when the antilock timer is greater than a predefined value, e.g., 128, antilock control is no applied and the operation of the brake pedal is transmitted directly to the brakes. However, if the antilock timer value is less than the predefined value, antilock control is still being applied and the brake fluid pressure is gradually increased.

Figure 2B:
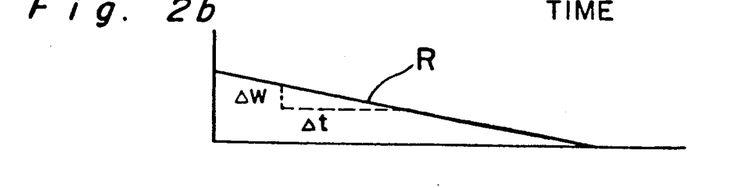
FIG. 2(b) is a graph showing the brake fluid pressure reduction signal K.

On the other hand, antilock control is required if at step #5 the flag is set, and at step #6 pressure reduction signal K is set for the desired pressure reduction rate R, i.e., desired pressure reduction ΔW per unit time Δt is set (FIG. 2(b)).

The pressure reduction signal K may be obtained from, for example, the equation:

$$K = |DECEL| \tag{1}$$

where DECEL is the wheel deceleration. The desired pressure reduction rate R may be more gradual than the average slope of the normal pressure reduction curve for the brake fluid pressure as shown in FIG. 2(b). When antilock brake control is applied, the pressure does not drop suddenly but intermittently. How this may be achieved is described with reference to FIG. 1. When intermittent pressure reduction is required, the intake solenoid valve 3 is first set to the pressurization buffer state and the exhaust solenoid valve 6 is then intermittently set to the conductive state. The solenoid opening coefficient J which causes the exhaust solenoid valve 6 to open and close intermittently is computed in step #8, but because the duty ratio determining intermittent operation is dependent upon the current brake fluid pressure, it is obtained by the relationship with the brake fluid pressure. Specifically, the solenoid opening coefficient J is obtained as $$J = K + \alpha. \quad (2)$$

Figure 6:
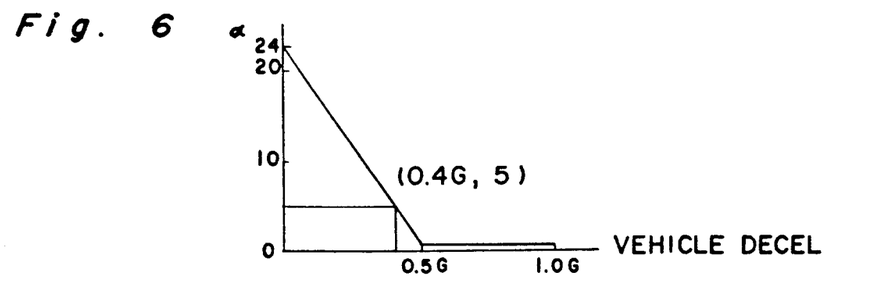
FIG. 6 is a graph showing the relationship between compensation value α and vehicle deceleration.
Figure 7A:
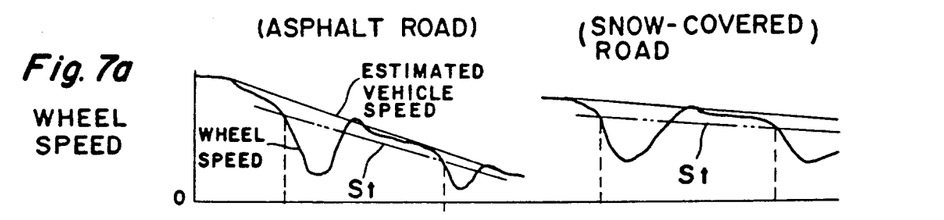
FIGS. 7a–i are graphs showing control on asphalt roads and snow-covered roads.
Figures 7B, 7C:
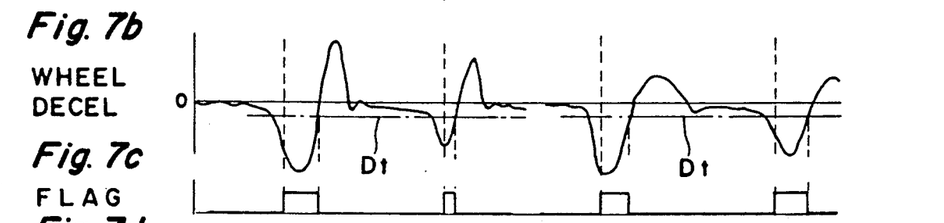
Figures 7D, 7E:
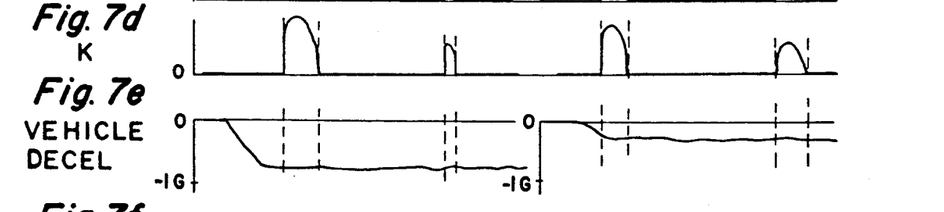
Figures 7F, 7G:
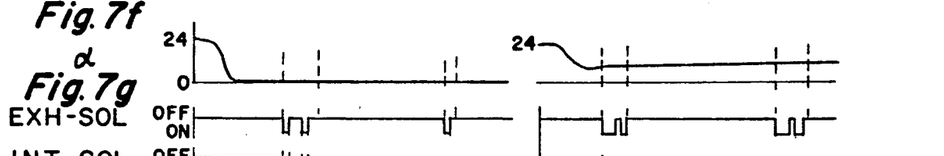
Figures 7H, 7I:
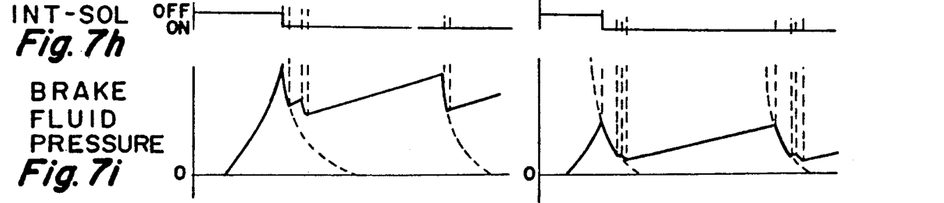

As shown in FIG. 6, the compensation value is a value obtained from the vehicle deceleration, which has a proportional relationship to the brake fluid pressure.

Table 1 shows sample settings of solenoid opening coefficients J and the duty ratio turning the solenoid on/off.

TABLE 1

| Open coef. J | Duty ratio | |
| --- | --- | --- |
|  | Off time | On time |
| J ≧ 72 | 0 (ms) | ∞ (ms) |
| 72 > J ≧ 48 | 6 | 24 |
| 48 > J ≧ 36 | 6 | 12 |
| 36 > J ≧ 24 | 6 | 6 |
| 24 > J ≧ 12 | 12 | 6 |
| 12 > J | 24 | 6 |
| J = 0 | ∞ | 0 |

The solenoid command is output in step #9 according to this duty ratio.

FIG. 7 is the operation wave form during antilock brake control on asphalt roads and on snow-covered roads. The wheel speed is obtained from the wheel speed sensors, and the wheel deceleration is obtained with a single differentiation of the wheel speed. The flag is set when the wheel speed is less than a predefined threshold St and the wheel deceleration is also less than a predefined threshold Dt. The absolute value of the wheel deceleration when the flag is set is output as the pressure reduction signal K, and the compensation value α is obtained from the vehicle deceleration, the first differential of the estimated vehicle speed. It is to be noted that the estimated vehicle speed can be obtained from the wheel speed. Next, the pressure reduction signal K and compensation value α are added, the solenoid opening coefficient J is obtained, and the duty ratio is obtained from Table 1. Because the exhaust solenoid valve 6 is intermittently opened and closed based on this duty ratio at a speed appropriate to the brake fluid pressure at any given point, appropriate antilock brake control is possible.

The case in which, for example, antilock brake control is necessary and the brake fluid pressure reduction signal K required for its execution is 30 is examined.

If conditions requiring antilock brake control occur on an asphalt road, the brake fluid pressure shows a relatively high value, and thus the vehicle deceleration, which is proportional to the brake fluid pressure, is high and the compensation value α is either zero or nearly zero. Therefore, the solenoid opening coefficient J is approximately equal to the pressure reduction signal K, and is thus approximately 30. In other words, pressure reduction occurs with a solenoid on/off time of 6/6 msec.

On the other hand, if conditions requiring antilock brake control occur on a snow-covered road, the brake fluid pressure shows a relatively low value, and thus the vehicle deceleration, which is proportional to the brake fluid pressure, is also low and the compensation value α is high, for example 20. Thus, the compensation value α is added to the pressure reduction signal K (=30), resulting in a solenoid opening coefficient J approximately 50, and pressure reduction occurs with a solenoid on/off time of 24/6 msec. In other words, because the brake fluid pressure is detected to be a low value on snow-covered roads, the solenoid on time percentage is longer, and the desired pressure reduction band can obtained.

According to the first embodiment of the present invention, because the current brake fluid pressure is detected and the pressure reduction signal K is corrected accordingly, even if the same pressure reduction signal K command is output, the solenoid opening coefficient J is determined using a value approximately equal to pressure reduction signal K on asphalt and other high μ roads, while the solenoid opening coefficient J is determined using a value greater than the pressure reduction signal K on snow-covered roads and other low μ roads. Thus, even if the brake cylinder pressure is low, the valve opening time can be made longer, and the desired pressure reduction can be obtained.

Therefore, according to the first embodiment of the present invention, even if antilock brake control is begun with a low brake fluid pressure, an unnecessary increase in wheel slipping due to insufficient pressure reduction, reduced steering control occurring with front wheel drive vehicles, and reduced vehicle stability occurring with rear wheel drive vehicles can be avoided. Furthermore, even if antilock brake control begins with a high brake fluid pressure, consistently stable antilock brake control occurs without fluctuating vehicle deceleration caused by excessive pressure reduction or such problems as, for example, increased braking distances.

Second Embodiment

When antilock brake control is applied while driving on a road surface where the coefficients of friction μ of the surfaces under the right and left wheels differ (such a surface is referred to a split μ surface), the brake fluid pressure for the right and left wheels when the wheels begin showing symptoms of locking, is approximately proportional to the coefficient of friction μ of the surface under each wheel on vehicles equipped with a multichannel antilock brake control system for controlling the right and left wheels independently. In other words, if the brakes ar applied to the right and left wheels according to the coefficient of friction μ of the respective road surface and locking symptoms are shown, the vehicle deceleration at this time will be a value proportional to the average of the coefficients of friction μ on the right and left sides. If antilock brake control is applied according to this vehicle deceleration, the pressure reduction time for the wheel on the high μ road surface side will be too long and the brake fluid pressure will drop excessively, thus inhibiting adequate vehicle deceleration; and at the same time, the pressure reduction time will be too short for the wheel on the low μ road surface side and the brake fluid pressure will not drop sufficiently, thus resulting in heavy slipping and reduced vehicle stability.

The aim of the second embodiment of the present invention is to provide a brake control device in an antilock brake system particularly for split μ road surfaces which can, on the split μ surface where the coefficients of friction μ for the road surfaces under the right and left wheels differ, set the pressure reduction signal low for the wheel on the high μ road surface, and set the pressure reduction signal high for the wheel on the low μ road surface, provided that the antilock brake system detects brake locking symptoms separately in the right and left wheels and automatically adjusts a valve to reduce the fluid pressure in the brake cylinder and cancel symptoms of brake locking.

The brake control device in an antilock brake control system for split μ road surfaces according to the second embodiment of the present invention fundamentally has the same structure as that shown in FIG. 3 or 4. The second embodiment differs from the first embodiment particularly in the operation carried out in pressure reduction time setters T0, T1, T2 and T3.

Figure 8:
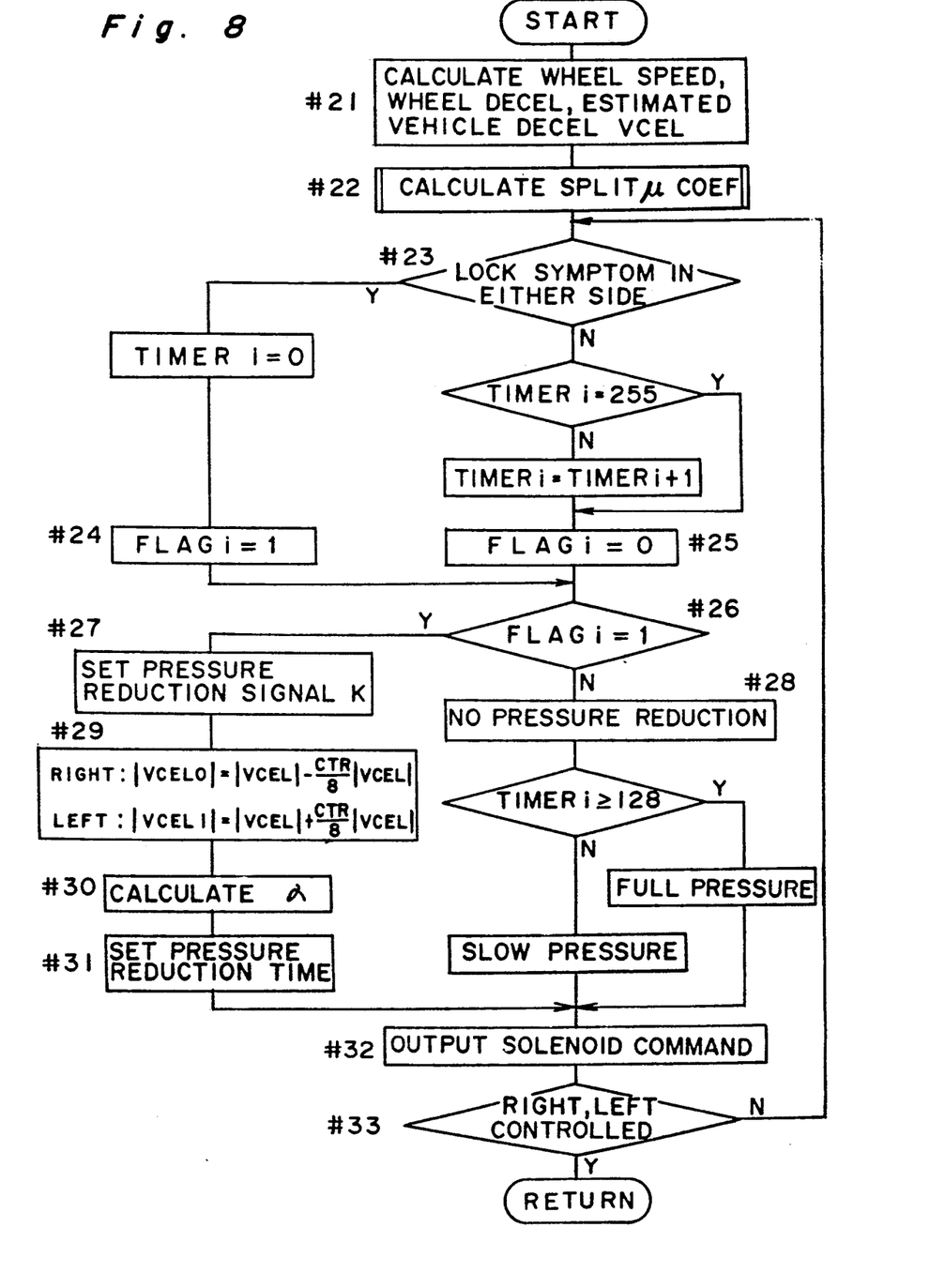
FIG. 8 is a flow chart of brake fluid pressure control for the brake control device in an antilock brake control system for split μ road surfaces according to the second embodiment of the present invention.
Figure 9:
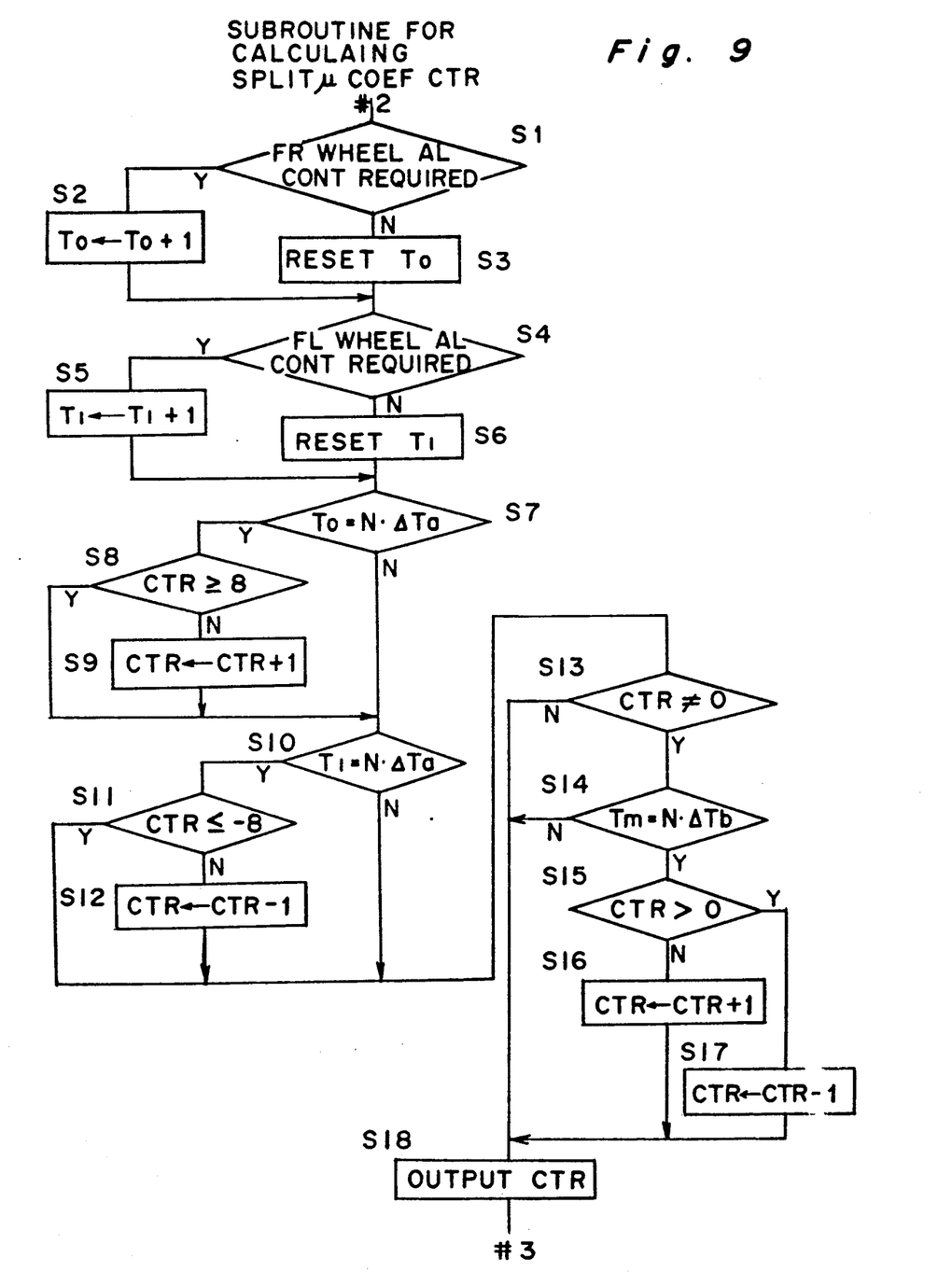
FIG. 9 is a flow chart of a subroutine used for calculating the split μ coefficient CTR.
Figure 10A:
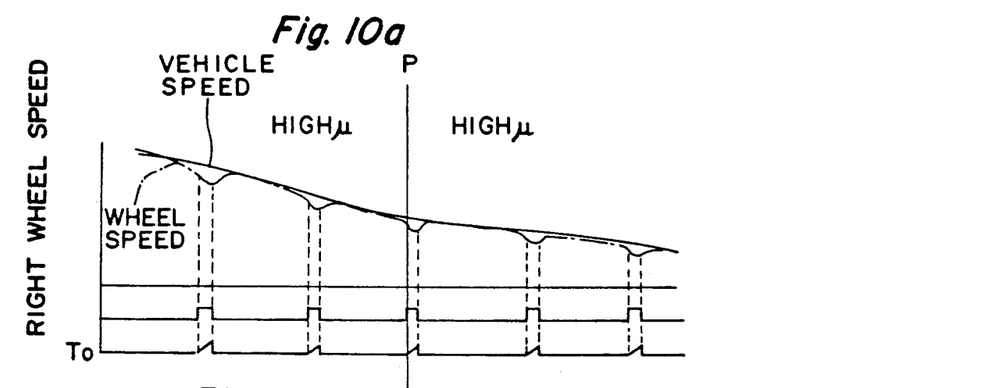
FIGS. 10a–10d are the graphs describing the operation on split μ road surfaces.
Figure 10B:
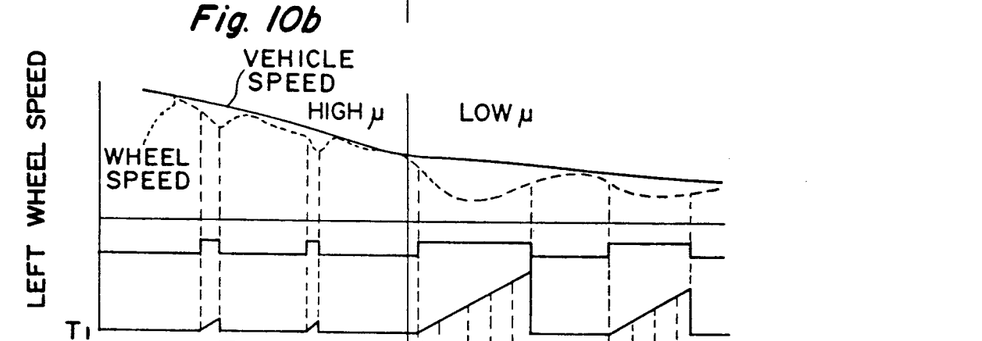
Figure 10C:
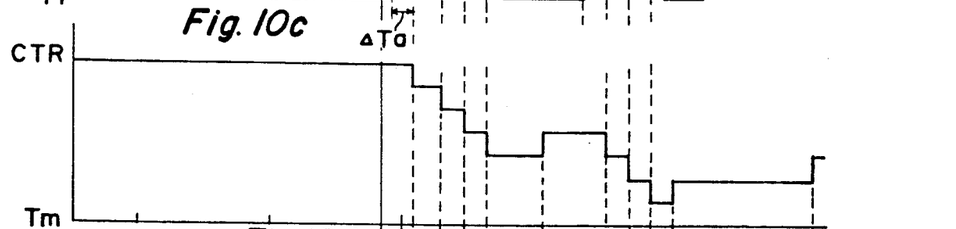
Figure 10D:
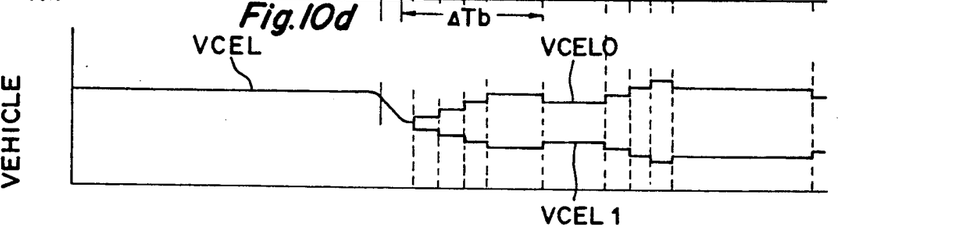

Referring to FIGS. 8 and 9, the operation of the brake control device in the antilock brake control for split μ road surfaces is described below.

At step #21, the wheel speed, wheel deceleration, and estimated vehicle deceleration VCEL are calculated in the same manner as in step #1.

Step #22 is a subroutine which calculates the split coefficient CTR. The details of this subroutine are shown in FIG. 9.

Referring to FIG. 9 at step S1, it is determined whether antilock brake control is required for the front right wheel based on the results of reading the wheel speed from the wheel speed sensors S0, S1, S2, and S3. If it is determined that antilock brake control is required, step S2 is advanced to and the timer T0 which counts the period during which it is determined that antilock brake control is required of the front right wheel is incremented. When it is determined that antilock brake control is not required, step S3 is advanced to and the timer T0 is reset. Likewise at step S4, it is determined whether antilock brake control is required for the front left wheel, and if it is required, step S5 is advanced to and the timer T1 which counts the required antilock brake control period for the front left wheel is incremented. Furthermore, when it is determined that antilock brake control is not required, step S6 is advanced to and the timer T1 is reset. In other words, when an antilock brake control request is issued for the right and left front wheels, timers T0 and T1 respectively count the required period at each request. At step S7, it is determined whether the count value of timer is an integral multiple of predefined value ΔTa, and if it is an integral multiple, step S8 is advanced to, and if it is not an integral multiple step S10 is advanced to. At step S8 it is determined if the count value CTR of the timer CTR for determining split μ road surfaces is greater than a defined upper limit, e.g., 8. If it is greater, step S10 is advanced to, and if it is less, step S9 is advanced to, the timer CTR is incremented, and step S10 is then advanced to.

It is to be noted that the counter value CTR of the timer CTR expresses the split μ coefficient, i.e., the difference in the coefficients of friction of the right and left side road surfaces. When it is zero, it shows that there is no difference in the coefficients of friction on the right and left road surfaces; if it increases in the positive direction, it shows that the coefficient of friction of the right side road surface is changing to a value less than that of the left side road surface; if it increases in the negative direction, it shows that the coefficient of friction of the left side road surface is changing to a value less than that of the right side road surface.

At step S10 it is determined whether the count of timer T1 is an integral multiple of predefined value ΔTa; if it is an integral multiple, step S11 is advanced to, and if it is not an integral multiple step S13 is advanced to. At step S11 it is determined if the count value of the timer CTR for determining split μ road surfaces is less than a defined lower limit, e.g., −8; if it is lower, step S13 is advanced to, and if it is greater, step S12 is advanced to, the timer CTR is decremented, and step S13 is then advanced to. In other words, timer CTR is constructed so that it counts in one direction for timer T0 proportionally to the count of timer T0, and for timer T1, counts in the direction opposite said one direction proportionally to the count of timer T1.

At step S13, it is determined if the count of timer CTR is zero or not; if it is zero, step S18 is advanced to; if it is not zero, step S14 is advanced to. At step S14, it is determined whether the count of free timer Tm, which continues counting for as long as the computer program is executing, is an integral multiple of predefined value ΔTb (>ΔTa), and if it is an integral multiple, step S15 is advanced to; if it is not an integral multiple, step S18 is advanced to. At step S15, it is further determined whether the count of timer CTR is positive or negative; if it is positive, timer CTR is decremented at step S17; if it is negative, timer CTR is incremented at step S16. Thus, timer CTR approaches zero at a rate slower than the rate of increase or decrease due to timers T0 and T1.

Returning back to FIG. 8, at step #23 it is detected whether there are any symptoms of brake locking in the wheels of one side, for example the right side wheels. When brake locking symptoms are detected, a flag is set at step #24 and the antilock timer is cleared; when locking symptoms are not detected, a flag is reset at step #25, and the antilock timer is incremented.

At step #26, it is detected whether the flag is set or not; if it is not, step #28 is advanced to; when the antilock timer is greater than a predefined value, e.g., 128, antilock control is not applied and the operation of the brake pedal is transmitted directly to the brakes. However, if the antilock timer value is less than the predefined value, it is determined that antilock control is still being applied and the brake pressure is gradually increased.

On the other hand, antilock control is required if at step #26 the flag is set, and at step #27 pressure reduction signal K is set for the desired pressure reduction rate R, as explained above in connection with FIG. 2b.

At step #29, if the coefficients of friction μ for the road surfaces under the right and left wheels differ, i.e., if the CTR value is not zero, the absolute value of right side limit vehicle deceleration VCEL0 and the absolute value of left side limit vehicle deceleration VCEL1 may be calculated from the following equations.

$$\text{(Right side)} \; |VCEL0| = |VCEL| - \frac{1}{8} CTR \cdot |VCEL| \quad (3)$$

$$\text{(Left side)} \; |VCEL1| = |VCEL| - \frac{1}{8} CTR \cdot |VCEL| \quad (4)$$

The right side limit vehicle deceleration is the vehicle deceleration at which antilock brake control would b expected to begin if the coefficients of friction for the road surfaces under both the right and left wheels were the same as the coefficient of friction for the road surface under the right side wheels, and the left side limit vehicle deceleration is the vehicle deceleration at which antilock brake control would be expected to begin if the coefficients of friction for the road surfaces under both the right and left wheels were the same as the coefficient of friction for the road surface under the left side wheels. It is to be noted that because the wheels on one side (e.g., the right side wheels) are being processed from step #23, the calculation results for said one side (e.g., right side) are selectively used, and at the next step #30 the compensation value α is obtained from the graph shown in FIG. 6 based on those calculation results. For example, if the right side limit vehicle deceleration is 0.4 G, compensation value α will be 5.

At step #31, the pressure reduction time, i.e., the solenoid opening coefficient J which causes the exhaust solenoid valve 6 to open and close intermittently, is computed using equation (2). Then, the on/off duty ratio for the solenoid is obtained for example from Table 1 described above.

The solenoid command is output in step #32 according to this duty ratio. Next at step #33, it is determined if the processing had been completed for both right and left wheels; if processing had been completed for only one side, step #23 is returned to and the same procedure is repeated for the wheels on the other side.

Referring to the graph shown in FIG. 10, what occurs when a split μ road surface begins at point P is discussed. Before point P, even if antilock brake control is applied to the right and left front wheels, because both wheels are on a high μ road surface with a high coefficient of friction, antilock brake control is approximately a high predefined period ΔTa even if it continues for a long period. Therefore, the control procedure in the flow chart is step #21, S1, S3, S4, S6, S7, S10, S13, S18, and repetition from S3 thereafter.

If point P is next exceeded, the right wheel continues on a high μ road surface while the left wheel is running on a low μ road surface with a low coefficient of friction. Therefore, the tendency for locking on the left side wheel increases, and to suppress this antilock brake control is required for a long period on the left wheel. In other words, the requirement for antilock brake control is unequal on the right and left wheels. Thus, steps S4 and S5 are repeated, and the count of timer T1 increases. Each time this count T1 becomes an integral multiple of the predefined period ΔTa, timer CTR is decremented (step S12), and the count of timer CTR is used to calculate the left and right limit vehicle deceleration VCEL0 and VCEL1. As shown in the graph in FIG. 10, left and right limit vehicle deceleration VCEL0 and VCEL1 take values symmetrically greater and less than the current vehicle deceleration VCEL at that time. The difference in the values increases as the value of CTR increases. Antilock brake control is thus applied independently for the right and left wheels according to the limit vehicle deceleration values thus obtained using the pressure reduction time information for each wheel (steps #30-#32).

After this, the count of the timer CTR tends to continue positive or negative (negative in the above example) as long as the vehicle is driving on a split μ road surface, and antilock brake control is applied to the right and left wheels according to the coefficient of friction of the road surface on the right and left sides, respectively.

It is to be noted that because each time the continuously operating timer Tm counts predefined period ΔTb and the count of timer CTR is incremented (step S16) or decremented (step S17) so that it approaches zero, when the vehicle escapes from the split μ road surface, the count of timer CTR quickly becomes zero, and the left and right limit vehicle deceleration VCEL0 and VCEL1 return to the normal vehicle deceleration VCEL.

According to the second embodiment of the present invention, the system is applicable to vehicles that set the pressure reduction signals independently for the right and left wheels based on the coefficients of friction of the road surfaces under the right and left wheels. According to the second embodiment, because pressure reduction is controlled independently, for a relatively short period of time for wheels on the high μ road side and for a relatively long period of time for wheels on the low μ road side, locking symptoms can be quickly alleviated even when high and low μ road surfaces are separated on the right and left sides, and maximum vehicle deceleration can be obtained for the possible range.

Third Embodiment

The third embodiment is directed to the brake control device in an antilock brake system for use in a motorcycle. When the antilock brake system is employed in a motorcycle, it is not possible to simply substitute the vehicle deceleration for the brake fluid pressure when the brakes are applied to a single wheel, because the brakes can be independently operated for the front and rear wheels on a motorcycle. If the vehicle deceleration is simply substituted for the brake fluid pressure when the brakes are applied to a single wheel, the following may occur.

When the brakes are applied to both the front and rear wheels, the vehicle deceleration (hereinafter "two-wheel limit deceleration") when the locking symptoms begin to appear varies according to the coefficient of friction μ of the road surface. Furthermore, when the brakes are applied to either the front or the rear wheel, the vehicle deceleration (hereinafter "one-wheel limit deceleration") when the locking symptoms begin to appear varies according to the coefficient of friction of the road surface, but is less than the two-wheel limit deceleration by a predefined percentage. Since antilock brake systems for motorcycles are normally designed on the premise that the brakes are applied to both the front and rear wheels, when the brakes are applied to only one wheel and the antilock brake system engages vehicle deceleration is determined to be low, a higher compensation value μ is obtained from the graph shown in FIG. 6, the pressure reduction signal (K+a) after compensation is thus higher, and the brake fluid pressure reduction time is longer than necessary. As a result, pressure reduction is excessive, and vehicle deceleration during antilock brake control varies and may be insufficient.

Figure 11:
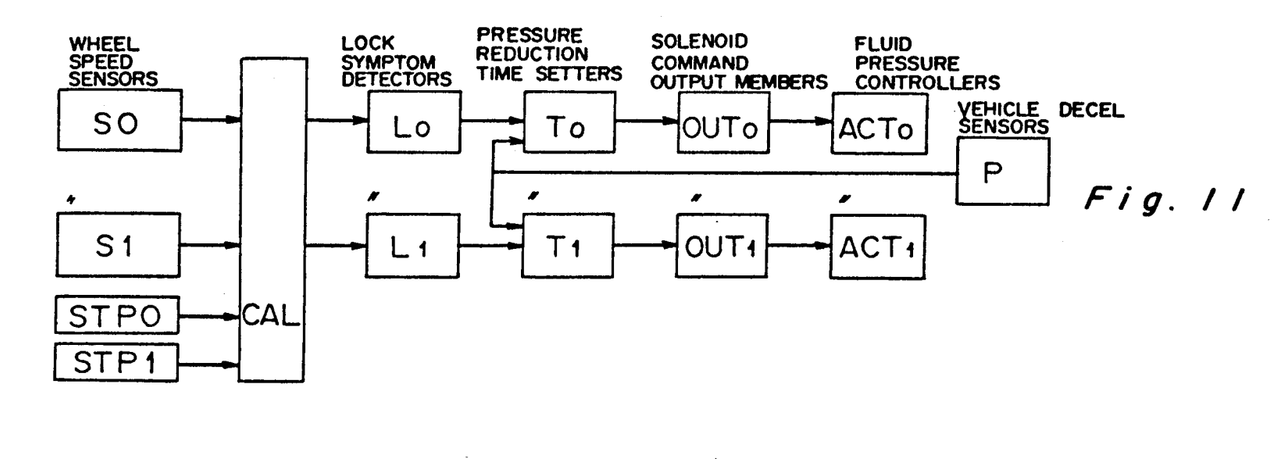
FIG. 11 is a block diagram showing the brake control device in a motorcycle antilock brake control system according to a third embodiment of the present invention.

Referring to FIG. 11 is a block diagram of the brake control device in a motorcycle antilock brake control according to the third embodiment of the present invention is shown. In this figure, S0 and S1 are the wheel speed sensors which detect, respectively, the speed of the front and rear wheels; STP0 and STP1 are the stop switches which turn the brake lights on when the brakes are applied, respectively, to the front and rear wheels; CAL is the calculator which computes the wheel deceleration, estimated vehicle speed, and estimated vehicle deceleration from the wheel speed; L0 and L1 are the lock symptom detectors which detect the locking symptoms for each wheel; T0 and T1 are pressure reduction time setters to which are input values proportional to the brake fluid pressure for each wheel from the vehicle deceleration sensor P, and which use this value to set the pressure reduction time required to apply antilock brake control to each wheel. OUT0 and OUT1 are solenoid command output devices which output a drive command to the solenoid valve solenoid according to the pressure reduction time; ACT0 and ACT1 are pressure reduction controllers which include the intake solenoid valve and exhaust solenoid valve. I the above construction, it is preferable that the calculator, lock symptom detector, pressure reduction time setter, and solenoid command output device be comprised of a microcomputer for processing.

Figure 12:
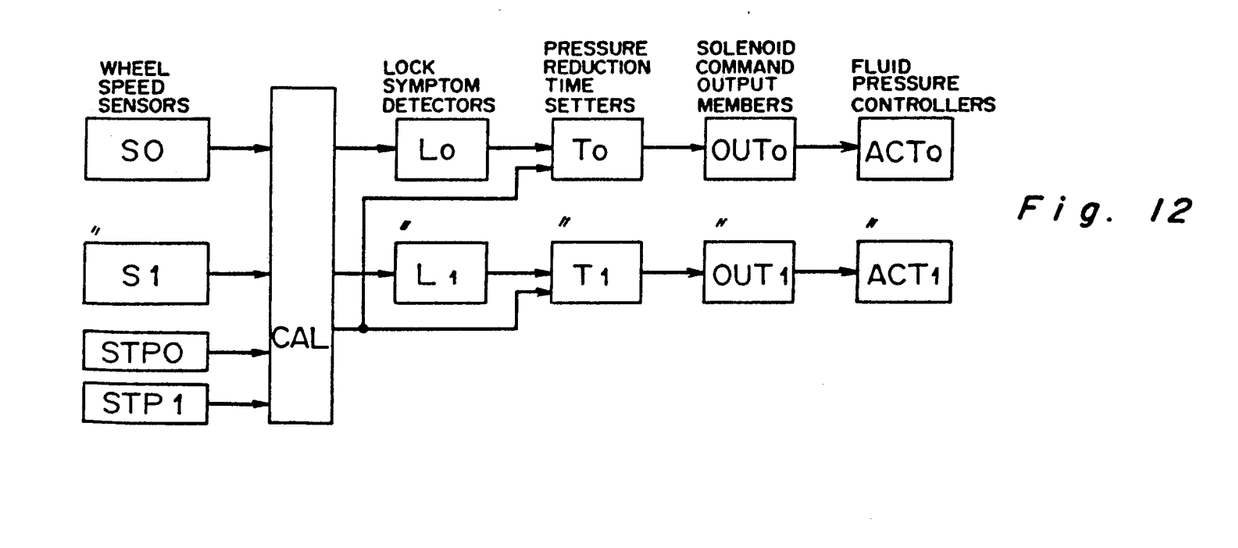
FIG. 12 is a block diagram showing a modification of the device shown in FIG. 11.

Furthermore, as shown in FIG. 12, the estimated vehicle deceleration may also be computed by the calculator CAL and the pressure reduction time set based on this result instead of providing a vehicle deceleration sensor.

Figures 13, 13B:
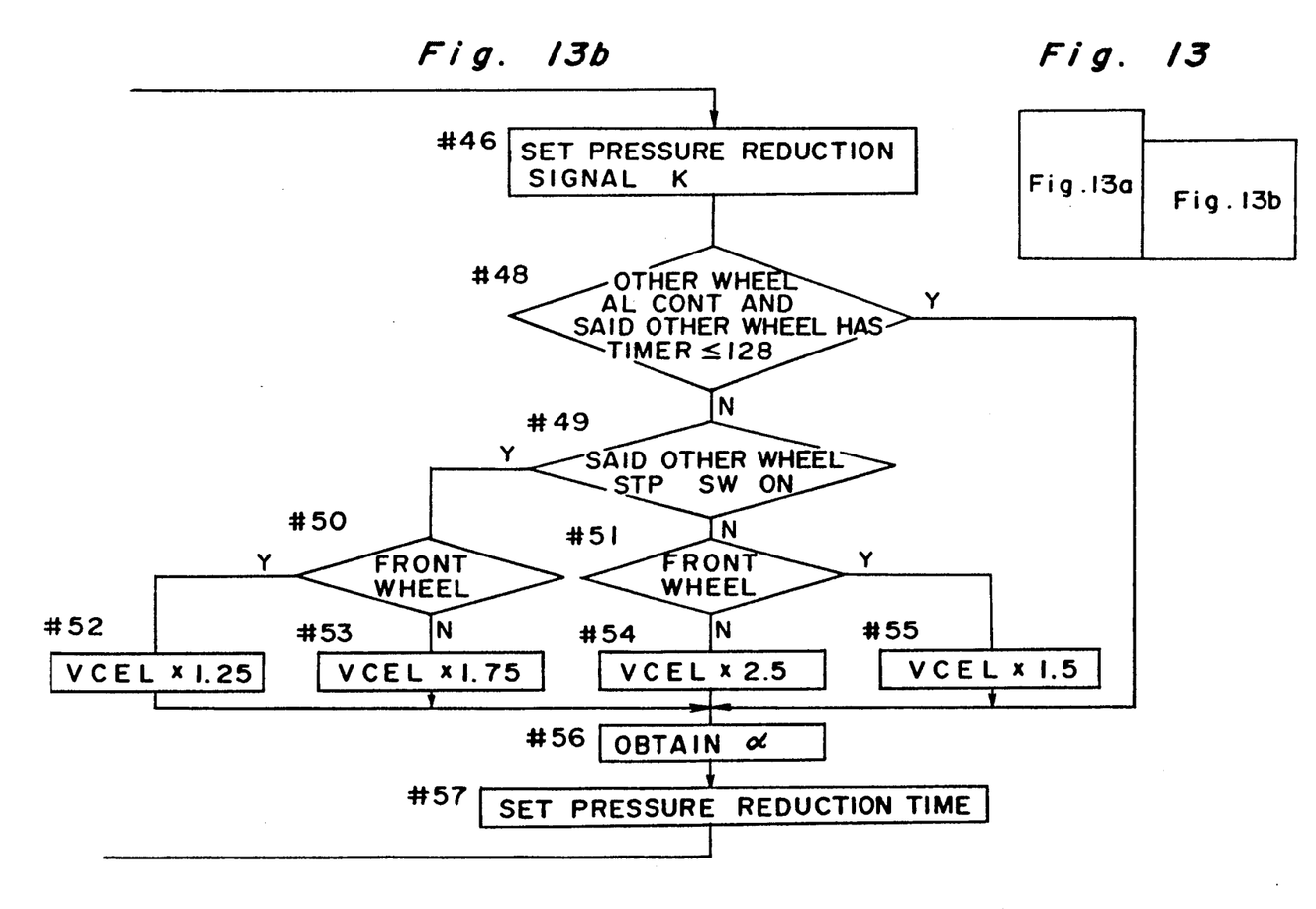
FIGS. 13a and 13b, taken together as shown in FIG. 13 show a flow chart of brake fluid pressure control for the system of FIG. 11.
Figure 13A:
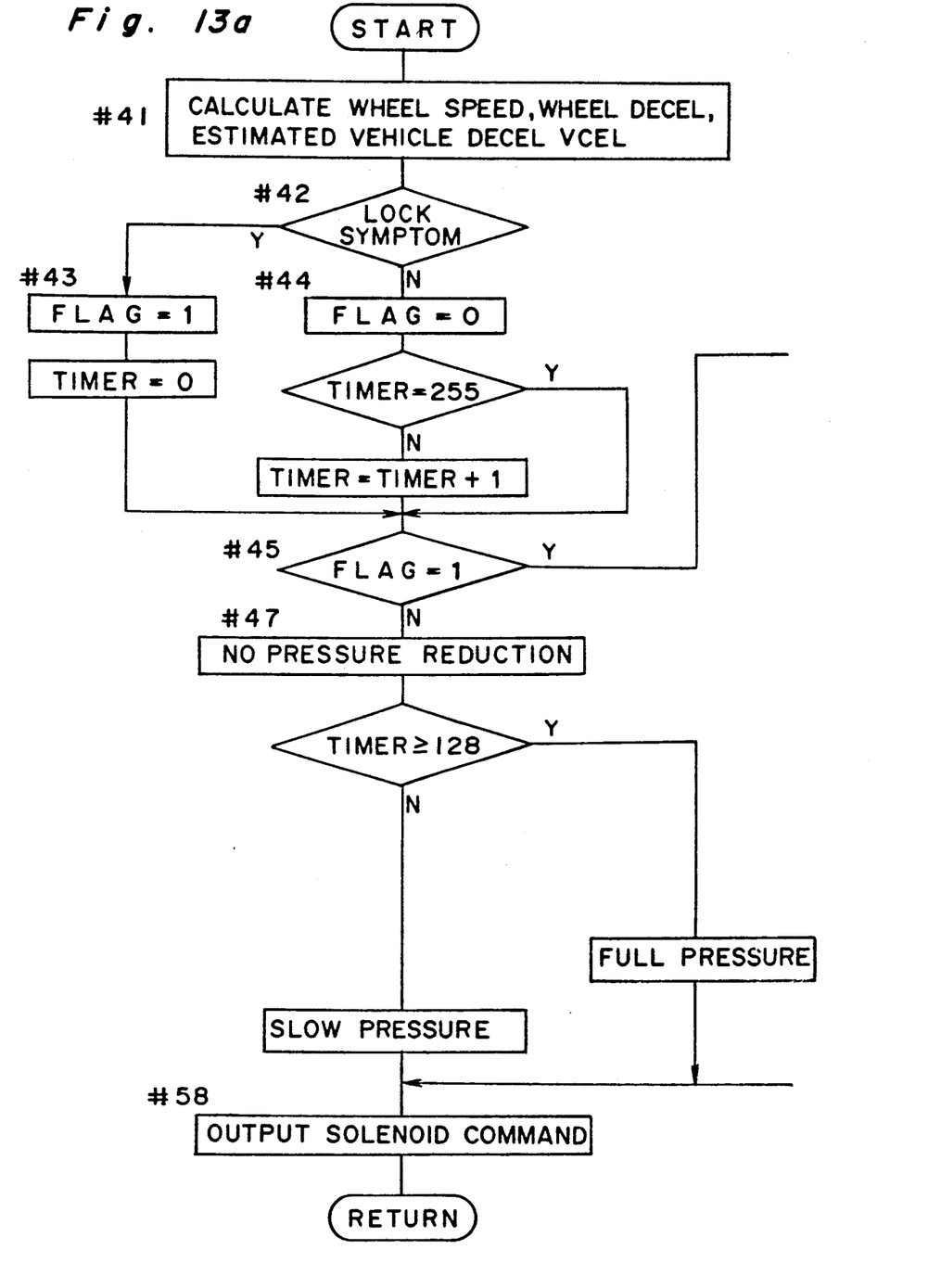

The operation of the brake control device in this antilock brake control is described herein below with reference to the flow chart in FIGS. 13a and 13b. It is to be noted this flow chart describes the process for only one wheel, but the same control operation is also executed for the other wheel.

Figure 5:
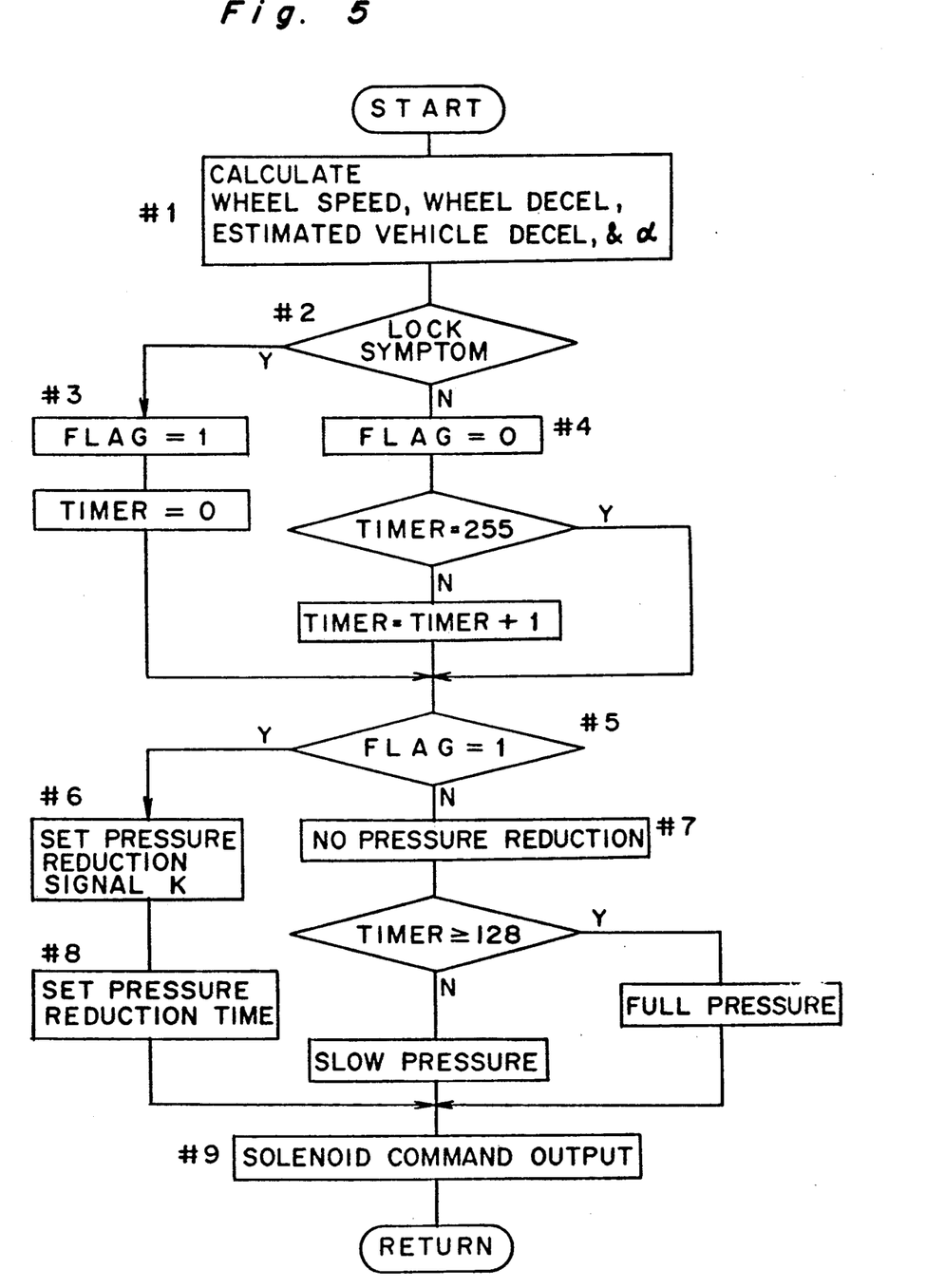
FIG. 5 is a flow chart of brake fluid pressure control according to the first embodiment of the present invention.

At step #41, the wheel speed, wheel deceleration, and estimated vehicle deceleration are calculated in the same manner as in step #1 of FIG. 5.

At step #42, it is detected whether there are any symptoms of brake locking. Brake locking may be detected by determining that the wheel deceleration is below a predefined wheel deceleration threshold when the wheel speed is also below a predefined wheel speed threshold, or by another method of common knowledge. When brake locking symptoms are detected, a flag is set at step #43 and the antilock timer is cleared; when locking symptoms are not detected, a flag is reset at step #44, and the antilock timer is incremented.

At step #45, it is detected whether the flag is set or not. If it is not, the antilock timer is compared with a predefined value, e.g., 128, and if the antilock timer value is greater, antilock control is not applied and the operation of the brake pedal or lever by the operator is transmitted directly to the brakes. However, if the antilock timer value is less than 128, antilock control is continued to buffer brake fluid pressurization.

On the other hand, if at step #45 the flag is set, pressure reduction DW per unit time Dt is set, and pressure reduction signal K is set to achieve this level of pressure reduction (FIG. 2(b)).

Steps #48 to #55 are the steps whereby the vehicle deceleration VCEL is corrected as shown in Table 2 below; the compensation value α is modified by these correction steps.

TABLE 2

| Antilock control | | STP | | Vehicle deceleration correction |
| --- | --- | --- | --- | --- |
| FW | RW | FW | RW | VCEL'= |
| X | X | — | — | VCEL |
| O | O | — | 13 | VCEL |
| O | X | — | X | VCEL × 1.5 |
| O | X | — | O | VCEL × 1.25 |
| X | O | X | — | VCEL × 2.5 |
| X | O | O | — | VCEL × 1.75 |

FW: Front, RW: Rear Wheel)

As shown in Table 2, when antilock brake control is not applied to the front and rear wheels together, and when antilock brake control is applied to the front and rear wheels together, the value VCEL' after vehicle deceleration correction uses the same value VCEL before correction. However, if antilock brake control is being applied to the front wheel and is not applied to the rear wheel, the compensation value VCEL' will differ depending on whether the stop switch STP for the rear wheel is on or off; if it is off, VCEL'=VCEL×1.5, and if it is on, VCEL'=VCEL×1.25. Furthermore, if antilock brake control is not applied to the front wheel and is applied to the rear wheel, the compensation value VCEL' will differ depending on whether the stop switch STP for the front wheel is on or off; if it is off, VCEL'=VCEL×2.5, and if it is on, VCEL'=-VCEL×1.75.

In order to make the above determinations, step #48 at which it is determined whether the antilock brake control is applied to the other wheel, step #49 at which it is determined whether the stop switch STP for the other wheel is on or off, steps #50 and #51 at which it is determined whether the currently detected wheel is the front wheel or not, and steps #52, #53, #54, and #55 at which the vehicle deceleration is amplified are provided. At step #56, compensation value α is obtained according to the corrected vehicle deceleration based on the graph shown in FIG. 6.

For example, if the brakes are applied to the front wheel only and antilock brake control is applied, the one-wheel limit deceleration VCEL computed at step #55 is increased 1.5 times at step #55 and a value VCEL, equivalent to the two-wheel limit deceleration is obtained. If the vehicle deceleration VCEL was 0.4 G at this time, the vehicle deceleration VCEL' after correction will be 0.6 G. Thus, the value of compensation value α is corrected to a value from 5–0 (see FIG. 6). As thus described, when antilock brake control is applied to only one wheel, the vehicle deceleration VCEL is amplify-corrected to the two-wheel limit deceleration VCEL' which would be expected if antilock brake control were applied to both the front and rear wheels, and compensation value α based on the corrected vehicle deceleration VCEL' is obtained from the graph in FIG. 6. Because the correction ratio applied to VCEL will vary with the height of the center of gravity and the wheelbase length of the vehicle, these values may be set as desired for each vehicle. In other words, vehicle deceleration VCEL' after compensation is the value which would be obtained if antilock brake control were applied to both the front and rear wheels. It is to be noted that when the brakes are applied, load transfer to the front axle occurs, and since braking the front wheel produces a vehicle deceleration closer to that achieved during both wheel braking than when the brakes are applied to the rear wheel only, the compensation is set to be greatest (2.5 times) during single wheel braking of the rear wheel only due to the output of the stop switch STP.

Next, the pressure reduction signal K obtained at step #46 and the compensation value α are added at step #56 to compute the solenoid opening coefficient J that intermittently opens the exhaust solenoid valve 6, and set the pressure reduction time, such as in the manner described above in connection with Table 1.

A brake control device in an antilock brake control system for motorcycles according to the third embodiment of the present invention computes the vehicle deceleration VCEL' for the case in which antilock brake control is applied to both wheels even if antilock brake control is applied to one wheel, and thus obtains compensation value α; the brake fluid pressure reduction time is not therefore longer than necessary and excessive pressure reduction does not occur, and antilock brake control with an appropriate degree of pressure reduction can occur.

Furthermore, because when antilock brake control is applied to one wheel it is determined whether the brakes are applied to the wheel to which antilock brake control is not applied and the vehicle deceleration VCEL' is computed, compensation value can be obtained for more specific situations, and antilock brake control with an even more specific degree of pressure reduction can be applied. Therefore, stable antilock brake control can be provided without discriminating between single or dual wheel brake control.

What is claimed is:

1. A brake control device for use in an antilock brake system for automatically adjusting a valve responsive to an indication of brake locking to reduce a fluid pressure in a brake cylinder to stop brake locking, said brake control device comprising:

means for outputting a pressure reduction signal K, in accordance with wheel deceleration;

pressure detecting means for providing an indication of a current brake cylinder fluid pressure;

means for outputting a compensation value α in accordance with vehicle deceleration, said vehicle deceleration being proportional to said fluid pressure;

means for calculating a solenoid opening coefficient J in accordance with said compensation value α and said pressure reduction signal K; and means for determining a duty ratio in accordance with said solenoid opening coefficient J, said duty ratio being a time signal indicative of predetermined time periods during which said valve is to be opened and closed to adjust the brake cylinder fluid pressure, the time period during which said valve is opened being larger when said detected current brake cylinder fluid pressure is decreasing, thereby maintaining said predetermined amount of pressure reduction.

2. A brake control device as claimed in claim 1, wherein said valve is provided in association with a solenoid so as to control on and off states of said solenoid.

3. A brake control device as claimed in claim 2, wherein said pressure reduction means further comprises for outputting a compensation value α according to the detected current brake cylinder pressure;

means for producing a solenoid opening coefficient J which is obtained by the use of said compensation value α and said pressure reduction signal K; and 4. A brake control device as claimed in claim 1, wherein said pressure reduction K is in proportional to said wheel deceleration.

5. A brake control device as claimed in claim 1, wherein said pressure detection means comprises a hydraulic pickup.

6. A brake control device as claimed in claim 1, wherein said pressure detection means comprises:

a vehicle deceleration sensor for sensing said vehicle deceleration; and means for calculating the brake fluid pressure as a function of said vehicle deceleration.

7. A brake control device as claimed in claim 1, wherein said pressure detection means comprises:

a wheel speed sensor for detecting a wheel speed;

means coupled to said wheel speed sensor, for calculating said vehicle deceleration from said detected wheel speed; and means for calculating the brake fluid pressure in proportion to said vehicle deceleration.

8. A brake control device in an antilock brake system for detecting brake locking symptoms separately in right and left wheels and for automatically adjusting a valve to reduce a fluid pressure in a brake cylinder for eliminating a symptom of brake locking, said brake control device comprising:

means for computing a split μ coefficient CTR, which expresses a difference in coefficients of friction of the road surfaces under said right and left wheels;

means for outputting a pressure reduction signal K; and means for correcting said pressure reduction signal K such that the pressure reduction signal K for a first wheel, which is on a road surface having a higher coefficient of friction, is decreased proportionally to said split μ coefficient CTR, and that said pressure reduction signal K for a second wheel, which is on a road surface having a lower coefficient of friction, is increased proportionally to said split μ coefficient CTR.

9. A brake control device as claimed in claim 8, wherein said means for computing said split μ coefficient CTR comprises means for comparing the amount of antilock control required on both the right and left wheels further comprising:

first timer means (T0) for counting a period from a time an antilock control request for the right wheel begins until the antilock control request for the right wheel is interrupted;

second timer means (T1) for counting a period from a time an antilock control request for the left wheel begins until the antilock control request for the left wheel is interrupted; and third timer means (CTR) for counting in one direction proportional to the count of said first timer, for counting in a direction opposite to said one direction proportional to the count of said second timer, and for counting towards zero after a predetermined period of time, said means for computing determining said split μ coefficient in accordance with a count from said third timer means.

10. A brake control device in an antilock brake system for detecting brake locking symptoms separately in right and left wheels and for automatically adjusting a valve to reduce a fluid pressure in a brake cylinder for eliminating a symptom of brake locking, said brake control device comprising:

means for computing a split μ coefficient CTR, which expresses a difference in coefficients of friction of the road surfaces under said right and left wheels;

means for outputting a current brake pressure level; and means for correcting said current brake pressure level such that said current brake pressure level for a first wheel, which is on a road surface having a higher coefficient of friction, is increased proportionally to said split μ coefficient CTR, and that said current brake pressure level for a second wheel, which is on a road surface having a lower coefficient of friction, is decreased proportionally to said split μ coefficient CTR.

11. A brake control device as claimed in claim 10, wherein said means for computing said split μ coefficient CTR comprises means for comparing the amount of antilock control required on both the right and left wheels further comprising:

first timer means (T0) for counting a period from a time an antilock control request for the right wheel begins until the antilock control request for the right wheel is interrupted;

second timer means (T1) for counting a period from a time an antilock control request for the left wheel begins until the antilock control request for the left wheel is interrupted; and third timer means (CTR) for counting in one direction proportional to the count of said first timer, for counting in a direction opposite to said one direction proportional to the count of said second timer, and for counting towards zero after a predetermined period of time, said means for computing determining said split $\mu$ coefficient in accordance with a count from said third timer means.

12. A brake control device in an antilock brake system for a motorcycle for automatically adjusting a valve provided in brake fluid lines for front and rear wheels of the motorcycle to reduce a fluid pressure in a brake cylinder for eliminating symptoms of brake locking independently in said front and rear wheels, said brake control device comprising:

means for detecting a vehicle deceleration (VCEL);

means of determining whether or not an antilock brake control is being applied to either one of said front and rear wheels;

vehicle deceleration amplification means for amplifying said detected vehicle deceleration by a predetermined amount to produce a corrected vehicle deceleration value when said determining means determines that said antilock brake control is being applied to one of said front and rear wheels; and antilock brake control means for increasing an amount of said antilock brake control to said one wheel by adjusting a time in which said valve is opened in accordance with said corrected vehicle deceleration value.

13. A brake control device as claimed in claim 12, wherein said vehicle deceleration amplification means comprises means for determining whether or not a brake is being applied to a wheel to which said antilock brake control is not being applied.

14. A brake control device as claimed in claim 12, wherein said vehicle deceleration amplification means comprises means for determining whether said one wheel is the front wheel or said one wheel is the rear wheel.

15. A brake control device as claimed in claim 12, wherein said vehicle deceleration amplification means comprises setting means for setting a correct amplification factor for each of the four different cases: when a brake is applied to said front wheel to which said antilock brake control is not applied; when said brake is not applied to said front wheel to which said antilock brake control is not applied; when said brake is applied to said rear wheel to which said antilock brake control is not applied; and when said brake is not applied to said rear wheel to which said antilock brake control is not applied.

* * * * *